United States Patent [19]

Jones

[11] 4,234,314
[45] Nov. 18, 1980

[54] GUARD-BED VAPOR BYPASS TO OVERCOME PRESSURE DROP IN MIXED-PHASE REACTIONS

[75] Inventor: Evan A. Jones, Mt. Prospect, Ill.

[73] Assignee: UOP Inc., Des Plaines, Ill.

[21] Appl. No.: 945,767

[22] Filed: Sep. 25, 1978

[51] Int. Cl.³ .................. G01N 7/00; G01D 7/00; G01D 16/00

[52] U.S. Cl. .................... 23/230 A; 422/110; 422/111; 422/112; 208/DIG. 1; 208/146

[58] Field of Search ............ 23/230 A; 422/112, 110, 422/111; 208/DIG. 1, 146

[56] References Cited

U.S. PATENT DOCUMENTS

| | | | |
|---|---|---|---|
| 3,128,129 | 4/1964 | Stine et al. | 422/112 X |
| 3,509,043 | 4/1970 | McMaster et al. | 208/146 |
| 3,598,539 | 8/1971 | Pizzato | 422/220 |
| 3,607,000 | 9/1971 | Beal et al. | 422/220 |
| 3,685,971 | 8/1972 | Carson | 422/220 |
| 3,981,797 | 9/1976 | Kellar | 208/DIG. 1 X |

*Primary Examiner*—Michael S. Marcus
*Attorney, Agent, or Firm*—James R. Hoatson, Jr.; John F. Spears, Jr.; William H. Page, II

[57] ABSTRACT

In a mixed-phase hydrocarbon hydroprocessing catalytic reaction system, wherein a guard-bed of particulate matter is employed above one or more individual beds of catalyst particles, the adverse detrimental effects of excessive reaction zone pressure drop are overcome by sensing the differential pressure across the guard-bed. Vaporous stream components are withdrawn from the reaction chamber through a locus above the guard-bed and at a rate proportional to the differential pressure. These withdrawn vaporous components are reintroduced into a substantially particle-free void volume below the guard-bed and above the bed of catalyst particles.

4 Claims, 1 Drawing Figure

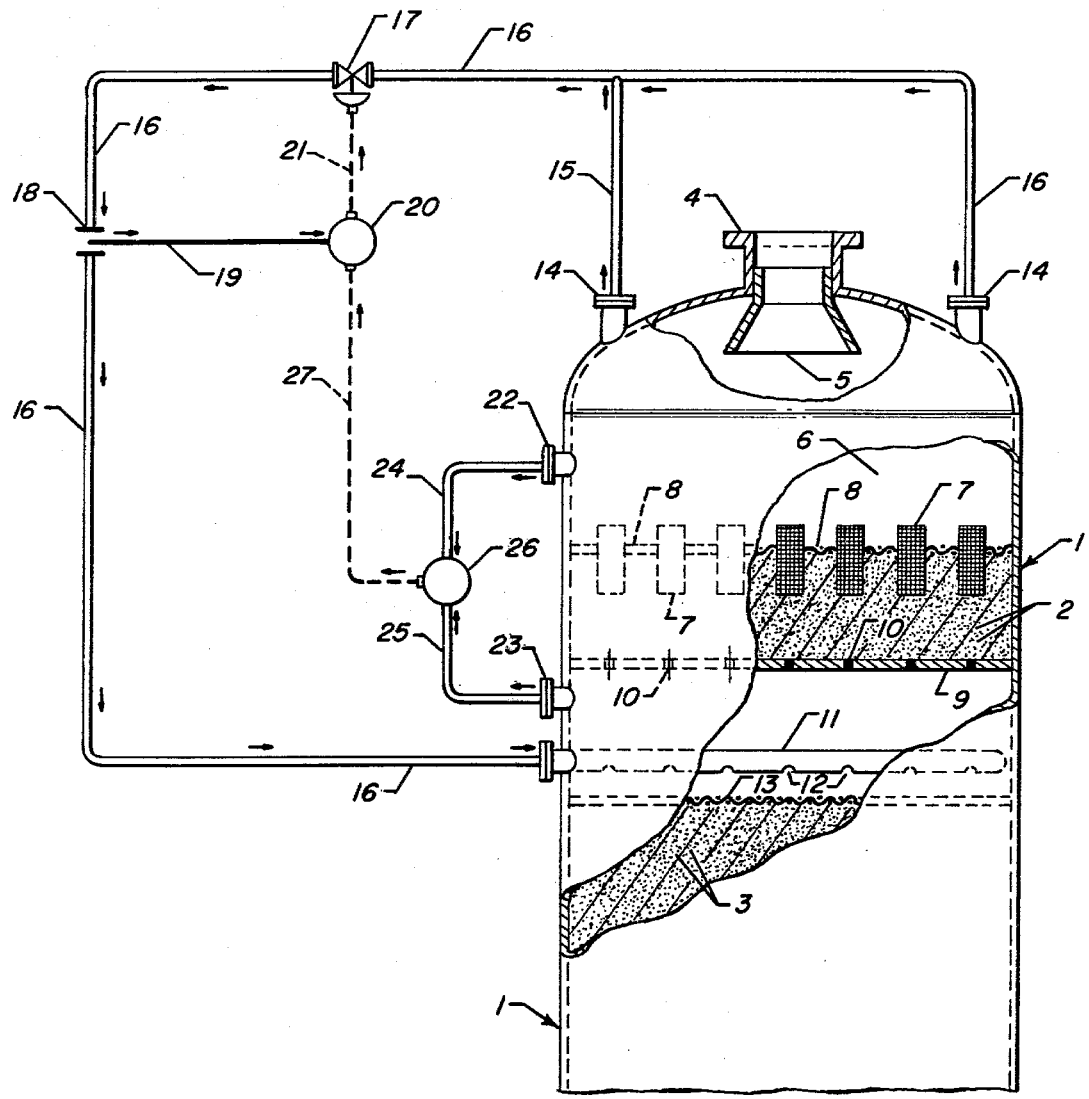

GUARD-BED VAPOR BYPASS TO OVERCOME PRESSURE DROP IN MIXED-PHASE REACTIONS

APPLICABILITY OF INVENTION

In its basic form, the invention herein described is intended to be applied to the fixed-bed catalytic conversion of hydrocarbonaceous material including various hydrocarbon distillates and undistilled fractions. More specifically, the principal application resides in alleviating the adverse detrimental effects of excessive reaction zone pressure drop arising as a result of the deposition of coke, carbon and foreign matter such as dirt and metallic scale onto the catalytic composite. Thus, the present invention is most applicable to the mixed-phase hydroprocessing of hydrocarbonaceous charge stocks boiling beyond the gasoline, or naphtha boiling range, wherein the problems associated with excessive pressure drop are more prevalent. Such charge stocks include kerosene fractions, light and heavy gas oils, cycle stocks, reduced and topped crude oils, and so-called black oils containing components boiling above a temperature of about 1050° F. (565.6° C.).

Problems associated with the conversion of these heavier feed streams also exist in naphtha conversion processes, but not to as great an extent. For the most part, a naphtha feed stream has undergone some type of treating and distillation prior to its intended use in a given conversion process. Furthermore, the conversion of naphtha fractions—i.e. boiling below about 400° F. (204.4° C.)—is generally effected in vapor phase. With the heavier hydrocarbonaceous feed streams, the reaction vessels are generally designed to effect the desired conversion reactions in downward plug-flow and in mixed-phase. Additionally, as hereinafter set forth in greater detail, the reaction vessel is adapted with a guard-bed of particulate matter disposed above one or more beds of catalyst particles. The guard-bed is often equipped with large surface area baskets which further alleviate the excessive pressure drop difficulties. Although the prior use of a guard-bed, whether formed from inert material or catalyst particles, has been shown to lengthen the acceptable on-stream period of operation, pressure drop across the reaction zone eventually attains the level at which the adverse effects become too severe for continued, successful operation. Utiliziation of the vapor bypass concept of the present invention further increases the on-stream acceptable processing period.

OBJECTS AND EMBODIMENTS

A principal object of my invention resides in extending the period of acceptable operation while effecting the mixed-phase hydroprocessing of hydrocarbons. A corollary objective is to provide a technique which overcomes excessive pressure drop during the mixed-phase hydroprocessing of various hydrocarbon mixtures.

More specifically, the present invention affords a method of reducing the overall reaction zone pressure drop and further provides a control system therefor.

In achieving these and other objects, the present invention provides, in one embodiment, a method for effecting mixed-phase hydrocarbon hydroprocessing which comprises the sequential steps of: (a) introducing a mixed-phase reactant stream into the upper-portion of a reaction zone wherein said reactant stream initially contacts a guard-bed of particulate matter disposed above one or more beds of catalyst particles; (b) sensing the pressure differential across said guard bed of particulate matter; (c) withdrawing vaporous reactant stream components from the upper portion of said reaction zone at a rate proportional to said pressure differential; and, (d) reintroducing said withdrawn vaporous reactant stream into a substantially particle-free area of said reaction zone below said guard bed.

A more specific embodiment of my inventive concept is intended for utilization in a catalytic hydrocarbon hydroprocessing reaction zone in which (1) a mixed-phase reactant stream initially contacts a guard-bed of particulate matter disposed above one or more beds of catalyst particles and, (2) the pressure drop across the guard bed increases during the processing period, and directs itself toward the method of reducing the overall reaction zone pressure drop which comprises the sequential steps of: (a) introducing said mixed-phase reactant stream into the upper portion of said reaction zone above said guard bed and distributing the reactant stream across the upper surface of the particulate matter therein; (b) sensing the pressure differential across said guard bed, comparing the sensed pressure differential with the pressure differential designated and predetermined by the adjustable set point of a differential pressure controller and, developing a signal representative of the resulting comparison; (c) regulating the quantity of vaporous reactant stream withdrawn from the upper portion of said reaction zone in response to said signal; and, (d) reintroducing the withdrawn vaporous reactant stream into said reaction zone through a locus below said guard bed.

Other objects and embodiments of the method encompassed by my inventive concept will become evident from the more detailed discussion which follows. In one such other embodiment, the signal representing the pressure differential comparison is transmitted to a flow controller, the adjustable set point of which is adjusted in response thereto, a second signal is developed representing the resulting set point adjustment and the quantity of withdrawn vaporous reactant stream is regulated responsive to said second signal.

CITATION OF RELEVANT PRIOR ART

Candor compels acknowledgment of the fact that mixed-phase processing problems associated with continually increasing reaction zone pressure drop have been recognized, by those having the requisite skill in petroleum refining, for a relatively long time. It necessarily follows that the appropriate prior art is replete with devices, methods and various techniques, all of which are directed toward the same end result—that of prolonging the period of acceptable processing notwithstanding steadily increasing reaction zone pressure drop. Also recognized is that the magnitude of pressure drop problems is greater in a mixed-phase reaction zone as compared to those experienced in a strictly vapor-phase operation. Of course, in either type of processing operation, the normal degree of coke and/or carbon deposition, stemming from the hydrocarbon conversion reactions, constitutes a contributing factor to reaction zone pressure drop. However, considering the mixed-phase type of operation, a greater quantity of foreign solids-type material is carried into the reaction zone by virtue of the presence of the liquid-phase reactant stream.

Prior art solutions to the problem of increasing pressure drop were initially solved through the installation of a guard-bed of particulate matter disposed above one or more beds of active catalytic particles. Although the guard bed could consist of catalyst particles, most techniques utilized inert material such as ceramic balls, berl saddles, raschig rings, etc., of a size greater than the catalyst particles. There followed the use of basket-type screen members which were inserted through the guard bed for the purpose of increasing the surface area between the catalyst particles and the incoming reactant stream components. One combination of a guard-bed and basket-type screen members is shown in U.S. Pat. No. 3,598,539 (Cl. 23-288), issued to Pizzato on Aug. 10, 1971. Here the guard-bed consists of a finite layer of inert ceramic balls (8) which are disposed above and in contact with the bed of catalyst particles (6). The basket-like screen members exist in the form of an inverted "T" with the butt being immersed in the catalyst particles while the run extends upwardly into and through the ceramic ball guard bed. The upper terminus of the vertical portion is protected by an inverted cap which prevents particulate matter entering with the reactant stream from being directly introduced into the basket-type screen member. While the objective of alleviating the adverse effects of excessive pressure drop caused by the deposition of foreign matter within the guard-bed are the same, Pizzato makes no differentiation between vapor and liquid bypass.

The combination of a guard-bed and basket-type screen members with a novel feed stream distribution device is the subject of U.S. Pat. No. 3,685,971 (Cl. 23-288), issued to Carson on Aug. 22, 1972. The ceramic ball guard-bed 4 again is in direct contact with the bed of catalyst particles 3. A plurality of cylindrical basket-type screen members 5, uniformly and circumferentially disposed across the cross-section of the reaction chamber 1, extend above and through the ceramic ball guard-bed and terminate within the catalyst bed. The flow-distributing device is intended to be applicable to a mixed-phase operation, and consists of a plurality of depending, spaced-apart, concentric and outwardly flaring frusto-conical baffle members disposed below an initial distributor plate in the form of a perforated splash block. In operation, both liquid and vaporous feed stream components are caused to bypass the guard-bed by flowing into and through the basket-type screen members. Thus, there is no recognition of the concept of bypassing only vaporous components around the guard bed.

Increasing on-stream time for a reaction zone containing a plurality of individual beds of catalyst particles, by providing one or more bypass conduits through at least one upper catalyst bed, is the object and function of U.S. Pat. No. 3,509,043 (Cl. 208-213), issued on Apr. 28, 1970 to McMaster et al. The upper portion of the bypass conduit, which extends a short distance above the catalyst surface and rests thereon, is a covered, frusto-conical screen member 14. In close proximity below the screen member, the bypass conduit 10 is provided with a disc-containing flange. The disc 12 is designed to rupture at a predetermined catalyst bed pressure drop, at which time both vaporous and liquid components will be caused to flow through the bypass conduit onto the next lower bed of catalyst particles.

Another internal bypass conduit for overcoming excessive pressure drop in a catalytic reaction zone is the subject of U.S. Pat. No. 3,607,000 (Cl. 23-1), issued on Sep. 21, 1971 to Beal et al. These conduits, all of which contain a preset rupture disc, extend through a distributor tray and a ceramic ball guard-bed, the upper surface of which is defined by a basket-containing tray, and terminate within the next lower bed of catalyst particles. The terminal end of each bypass conduit is slotted and adapted with a wire mesh blanket containing ceramic, or alumina balls. When the pressure drop exceeds the pressure rating, the disc ruptures and the reactant stream, both liquid and vaporous components, flow into and through the bypass conduit into the succeeding lower catalyst bed.

A perusal of the foregoing delineated references, copies of which accompany this application, indicates complete lack of recognition of bypassing only vaporous feed components around the guard-bed while effecting mixed-phase hydrocarbon conversion reactions. Indeed, the described devices are incapable of so operating.

SUMMARY OF INVENTION

As hereinbefore stated, excessive pressure drop due to plugging by the existence of foreign matter in the incoming fresh feed stream eventually arises in vapor phase operations such as the catalytic reforming of naphtha fractions and distillates. Here, however, the major factor appears to be the deposition of coke and other carbonaceous material in and throughout the catalyst particles. In fact, the majority of unit shutdowns for catalyst regeneration or replacement are necessitated solely by the internal formation of coke and carbonaceous material which effectively shields the active catalyst sites from the vaporous feed components being processed. On the other hand, the opportunity for foreign matter to enter the reaction zone with a mixed vapor and liquid feed stream is enhanced by virtue of the presence of the liquid components, and increases as the molecular weight of the charge stock increases.

In petroleum refining operations, two types of conversion reactions exist: those which are hydrogen-producing, and those reactions which consume hydrogen. The latter type are effected in a mixed-phase reaction zone, and have been categorized in the art as hydroprocessing reactions. As such, they require greater quantities of hydrogen within the reaction zone and more severe operating conditions, especially higher pressures, higher catalyst bed temperatures and lower liquid hourly space velocities. The effects of pressure drop are significantly more pronounced at the higher severities, due both to more rapid coke formation and incoming foreign matter. The latter includes finely divided rust and dust, dirt, mill scale, scale from corrosion of vessels, polymeric material formed in heaters and storage tanks, etc.

In accordance with the method encompassed by my inventive concept, pressure drop effects in mixed-phase hydrocarbon hydroprocessing are overcome via only vapor bypassing the guard-bed of particulate matter and the basket-type screen members which may be disposed therein. Contrary to the delineated prior art, the vaporous reactant stream components are withdrawn externally from the reaction chamber and reintroduced into a substantially particle and catalyst free void volume above the main bed of catalyst particles. Furthermore, the present method affords a measure of control not found in the prior art which relies upon a preset rupture disc before any reactant stream bypass takes place.

During the mixed-phase operation, the differential pressure across the guard-bed, whether consisting of inert ceramic material, catalyst particles or a mixture, is sensed through the use of a differential pressure controller (which may also function as a recorder). The controller has an adjustable set point which is set at a predetermined pressure differential as dictated by previous experience in a given process utilizing a given fresh feed charge stock. A comparison is made between the sensed pressure differential and that which is currently dictated by the adjustable set point, and an appropriate signal, representative of the comparison, is generated. This is transmitted to a flow controller (which may also function as a recorder) which is part of a flow control loop disposed without the confines of the reaction zone. In addition to the flow controller, the control loop consists of flow-sensing means such as an orifice meter, turbine meter or venturi, and control means such as a flow control valve. The flow controller has an adjustable set point which is preset to permit the withdrawal of some vaporous feed stream components during the initial portion of the processing period. The flow is sensed, a comparison is made with the flow rate designated by the set point and a signal generated to represent the comparison. This signal is transmitted to the flow control valve, the opening of which is adjusted responsive thereto. The signal from the differential pressure controller is transmitted to the flow rate controller to effect a responsive change in the adjustable set point thereof. In turn, this causes an adjustment of the signal representing the flow rate comparison which, when transmitted to the flow control valve, effects a further adjustment in the quantity of vaporous reactant withdrawn from the reaction vessel. The vapors so withdrawn are reintroduced into a substantially void volume intermediate the guard-bed and the bed of catalyst particles through a suitable distribution device.

A correlation plot of catalyst void volume and pressure drop, the latter for the two phase drop without bypass and the vapor bypass is summarized in the following Table. The plot indicates that the pressure drop of the liquid phase only is about 10.0% of the two phase drop for a broad range of plugging as represented by void volume.

TABLE

Void Volume vs. Pressure Drop

| Void Volume, Percent | Pressure Drop, psi./ft. | |
|---|---|---|
| | Two-Phase | Vapor Bypass |
| 50.0 | 0.30 | 0.02 |
| 40.0 | 0.47 | 0.06 |
| 30.0 | 1.50 | 0.20 |
| 20.0 | 6.40 | 0.74 |
| 10.0 | 60.00 | 7.50 |

BRIEF DESCRIPTION OF DRAWING

The remaining description of the present invention will be made with reference to the accompanying drawing. Illustrated is a fragmentary sectioned view of a reaction vessel 1 having a guard-bed of suitable ceramic material 2 disposed a finite distance above a bed of catalyst particles 3.

DETAILED DESCRIPTION OF DRAWING

Specifically referring now to the drawing, the mixed-phase reactant stream is introduced into the reaction chamber 1 through an inlet conduit port 4 which is equipped with a suitable mixed-phase distribution device 5. The reactant stream is distributed within plenum chamber 6 and throughout the upper surface of guard-bed 2. A plurality of basket-like screen members 7 (which may be any type of the prior art configurations) extend through perforated plate or screen member 8 into guard-bed 2. The latter is supported by a grating 9 having apertures 10 through which the mixed-phase reactant stream flows into the void volume and is distributed over catalyst bed 3 through perforated plate or screen member 13.

Plenum chamber 6 is adapted with a plurality (two are shown) of vapor-phase withdrawal ports 14 communicating with conduits 15 and 16. The adjustable set point of Flow Controller 20 is preset to cause flow control valve 17 to be open during start-up to permit the flow of vapors through conduit 16. The flow is metered by an orifice meter 18 which communicates with Flow Controller 20 via conduit 19. If the metered flow rate differs from that designated by the adjustable set point, a signal is generated and transmitted via instrument line 21 to control valve 17, and the opening thereof appropriately adjusted in response thereto.

Similarly, the adjustable set point of Differential Pressure Controller 26 is preset at a level determined by previous experience with the type of feedstock being processed in reaction chamber 1. Pressure sensing elements 22 and 23 continually sense the pressure within chamber 6 and the void volume between guard-bed 2 and catalyst bed 3, respectively. These communicate via conduits 24 and 25 with Differential Pressure Controller 26 which compares the sensed pressure differential across guard-bed 6 with that which is designated by the set point. A signal, representing the comparison, is generated and transmitted via instrument line 27 to Flow Controller 20, the set point of which is adjusted accordingly. The signal generated by Flow Controller changes and the opening of control valve 17 is adjusted responsive thereto. As the pressure differential increases, the quantity of vapors withdrawn from plenum chamber 6 increases; these withdrawn vaporous components continue through conduit 16 and are reintroduced into the reaction chamber through distributing means 11 containing downwardly directing apertures 12.

I claim as my invention:

1. In a catalytic hydrocarbon conversion process in which (1) a mixed-phase hydrocarbon reactant stream initially contacts a guard bed of particulate matter disposed above and spaced from one or more beds of catalyst particles in a reaction zone, the guard bed and the one or more beds of catalyst being disposed in vessel means, and, (2) the pressure drop across the guard bed increases during the processing period, the method of reducing the overall reaction zone pressure drop which comprises the sequential steps of:

(a) introducing said mixed-phase hydrocarbon reactant stream into the upper portion of said reaction zone above said guard-bed and distributing the reactant stream across the upper surface of the particulate matter therein;

(b) sensing the pressure differential across said guard-bed, comparing the sensed pressure differential with the pressure differential designated and predetermined by an adjustable set point of a differential pressure controller and developing a signal representative of the resulting comparison;

(c) withdrawing a vaporous reactant stream from the upper portion of said reaction zone above said guard bed and external to said vessel means and regulating the quantity thereof in response to said signal; and, (d) reintroducing the withdrawn vaporous reactant stream into the space within said reaction zone between said guard-bed and the catalyst bed below the guard-bed.

2. The method of claim 1 further characterized in that said signal is transmitted to flow control means from the resulting adjustment of which the quantity of vaporous reactant stream withdrawn from the upper portion of said reaction zone is regulated.

3. The method of claim 1 further characterized in that said signal is transmitted to a flow controller, the adjustable set point of which is adjusted in response thereto, a second signal is developed representing the resulting adjustment and the quantity of said withdrawn vaporous reactant stream is regulated responsive to said second signal.

4. The method of claim 2 further characterized in that said flow control means consists of a flow controller, a flow control valve communicating with said flow controller and flow-sensing means communicating with said flow controller.

* * * * *